Feb. 20, 1962  J. D. CONRAD, JR  3,021,719
ROTOR TURNING GEAR CONTROL APPARATUS
Filed July 21, 1960  3 Sheets-Sheet 1

INVENTOR
JOSEPH D. CONRAD JR.
BY Frank Critano Jr.

Feb. 20, 1962 J. D. CONRAD, JR 3,021,719
ROTOR TURNING GEAR CONTROL APPARATUS
Filed July 21, 1960 3 Sheets-Sheet 2

INVENTOR
JOSEPH D. CONRAD JR.

Feb. 20, 1962 J. D. CONRAD, JR 3,021,719
ROTOR TURNING GEAR CONTROL APPARATUS
Filed July 21, 1960 3 Sheets-Sheet 3

INVENTOR
JOSEPH D. CONRAD JR.
BY Frank Cristiano Jr.

United States Patent Office 3,021,719
Patented Feb. 20, 1962

3,021,719
ROTOR TURNING GEAR CONTROL APPARATUS
Joseph D. Conrad, Jr., Glen Mills, Pa., assignor to Westinghouse Electric Corporation, East Pittsburgh, Pa., a corporation of Pennsylvania
Filed July 21, 1960, Ser. No. 44,509
5 Claims. (Cl. 74—472)

This invention relates to apparatus for imparting slow rotation to a rotor or shaft, such as a turbine rotor, and has for an object to provide improved apparatus of this type.

More particularly, it is an object of the invention to provide apparatus of the above type which may be remotely controlled and which is arranged to drivingly connect a turning gear motor to a turbine rotor without damage to the gearing which effects the driving connection between the motor and the rotor.

Another object of the invention is to provide a mechanism which performs two operations in rapid sequence, so that the turning motor gearing may be first brought into operative association with the driven gear on the rotor and then actuates switching apparatus for connecting the motor to a source of energy.

In the turbine art, more particularly the steam turbine art, it is highly desirable to rotate the turbine rotor slowly on the order of 3–30 r.p.m. for a period of time before applying motive steam thereto, in order to eliminate the slight bowing of the rotor which occurs during periods of prolonged activity. Also, it is desirable to slowly rotate the rotor for a period of time after the turbine is taken out of service and the motive steam flow therethrough is interrupted, in order that the entrapped hot steam in the internal structure of the turbine may be uniformly scavenged. During such slow rotation after shut down, the internal components of the turbine slowly cool and minimize the possibility of warpage due to uneven cooling, which would otherwise occur.

The turning gear mechanism employed to slowly rotate the turbine rotor in the manner described above, usually comprises an electric motor which has a driving gear attached to the output shaft and disposed in continuous driving relation with an idling pinion. The idling pinion is carried by a lever and is movable thereby into and out of driving engagement with a driven gear attached to the turbine rotor. In order to prevent tooth damage to the idling pinion and/or the driven gear, it has been found essential to engage the turning gear when the turbine motor is at zero speed, that is, motionless. Also, since due to the relative position of the idling pinion and the driven gear, immediate and smooth meshing is often impossible until the idling pinion "slips a tooth," care must be taken in engaging the turning gear.

When the above engaging operation is manually effected, skill of the operator is employed to obviate damage to the gearing. However, when the turning gear mechanism is either automatically or remotely controlled, many problems arise.

In view of the above, it is a more specific object of the invention to provide apparatus for slowly rotating a turbine rotor, which apparatus may be remotely controlled and performs the gear engaging operation and the motor connecting operation in predetermined sequential steps, thereby obviating the possibility of damage to the turning gear, and further promoting smooth engagement of the idling pinion with the driven gear.

A more specific object is to provide apparatus of the above type which is actuated in response to a fluid pressure signal. The fluid pressure signal employed may be of relatively short duration and may be either provided by hydraulic (non-compressible) fluid or pneumatic (compressible) fluid.

Briefly, in accordance with the invention, there is provided a turning gear motor, preferably electrically energized, and including an idling pinion driven by the motor and selectively movable into and out of engagement with a driven gear connected to a rotor which is to be driven at a slow speed of rotation. The idling pinion is carried by a lever which is pivotally supported adjacent the axis of rotation of a driving gear connected to the motor output shaft.

The lever is controlled through its range of movement by a linkage mechanism comprising a cylinder having a piston slidably disposed therein and dividing the cylinder into first and second chambers. The piston has a rod pivotally connected to the lever, and means for selectively imparting a pressurized fluid signal to the first and second chambers is also provided. The cylinder is movable axially with relation to the piston rod and is further provided with an abutting portion for actuating an electric switch controlling energization of the turning gear motor. The cylinder is biased in a direction to maintain the switch in the off position, but is movable against said bias by the pressurized fluid signal to actuate said switch to the on position. This switch is preferably, though not essentially disposed in an electrical "holding" circuit of a well known type which may include a second or "holding" switch which is actuated by the lever from the off position to the on position to complete the circuit to the turning gear motor.

When both switches are in the on position, an electromagnetically operated switch is moved to the on position to complete the circuit to the motor and the holding switch is thereafter effective to maintain the thus established circuit, even though the first switch is subsequently moved to the off position. However, when the holding switch is also moved to the off position, the holding circuit is opened and the electromagnetic switch releases the contacts in the motor circuit, thereby disconnecting the motor from its power supply.

The pressurized fluid signal to the cylinder is controlled by a suitable selector valve which, when moved in one direction provides pressurized fluid to the first chamber and bleeds any fluid contained in the second chamber. As the fluid is admitted to the first chamber, the piston is moved axially and its piston rod is effective to move the lever to a position in which the idling pinion is brought into contact with the driven gear and the holding switch is actuated to its on position. As mentioned before, the idling pinion may or may not properly mesh with the driven gear. However, since the lever is moved by fluid pressure, no damage is done to the gear teeth regardless of their mutual relation. Subsequent to such movement of the piston, the cylinder is moved in a direction opposite to the movement of the piston and against the spring bias, thereby moving the first switch to the on position. Since the holding switch is in the on position, the turning gear motor is connected to the power supply and initiates rotation of the idling pinion. Should the teeth of the idling pinion and driven gear be in abutment (but not engaged) with each other, the pinion will slip one tooth. As the pinion slips a tooth, the fluid pressure in the first chamber immediately forces the piston further in the initial direction, thereby causing the lever to move sufficiently to cause full engagement of the idling pinion with the driven gear and rotation of the driven gear is immediately, yet smoothly, initiated.

After engagement of the idling pinion with the driven gear, the fluid pressure signal may be terminated and the fluid pressure bled from the cylinder, thereby causing the cylinder to be moved to its original position by its bias and moving the first switch to its off position. The holding switch is thereafter effective to maintain energization of the driving gear motor through the holding circuit, and the idling pinion is maintained in engagement with the driven gear even though the fluid pressure against the piston is terminated.

The turbine rotor is thus driven at slow speed by the turning gear mechanism for as long a period as desired. When the turning gear is operated before starting the turbine, as motive steam is applied to the turbine the increase in speed of the driven gear forces the idling pinion out of engagement therewith. At this time, the selector valve is moved in the opposite direction, thereby admitting the pressurized fluid signal to the second cylinder chamber. As fluid pressure builds up in the second chamber, the piston is moved toward the first chamber, thereby moving the lever to its original position in which the idling pinion is completely disengaged from the driven gear and the apparatus is conditioned for another such cycle of operation when desired.

The foregoing and other objects are effected by the invention as will be apparent from the following description and claims taken in connection with the accompanying drawings, forming a part of this application, in which:

Figures 1, 2:
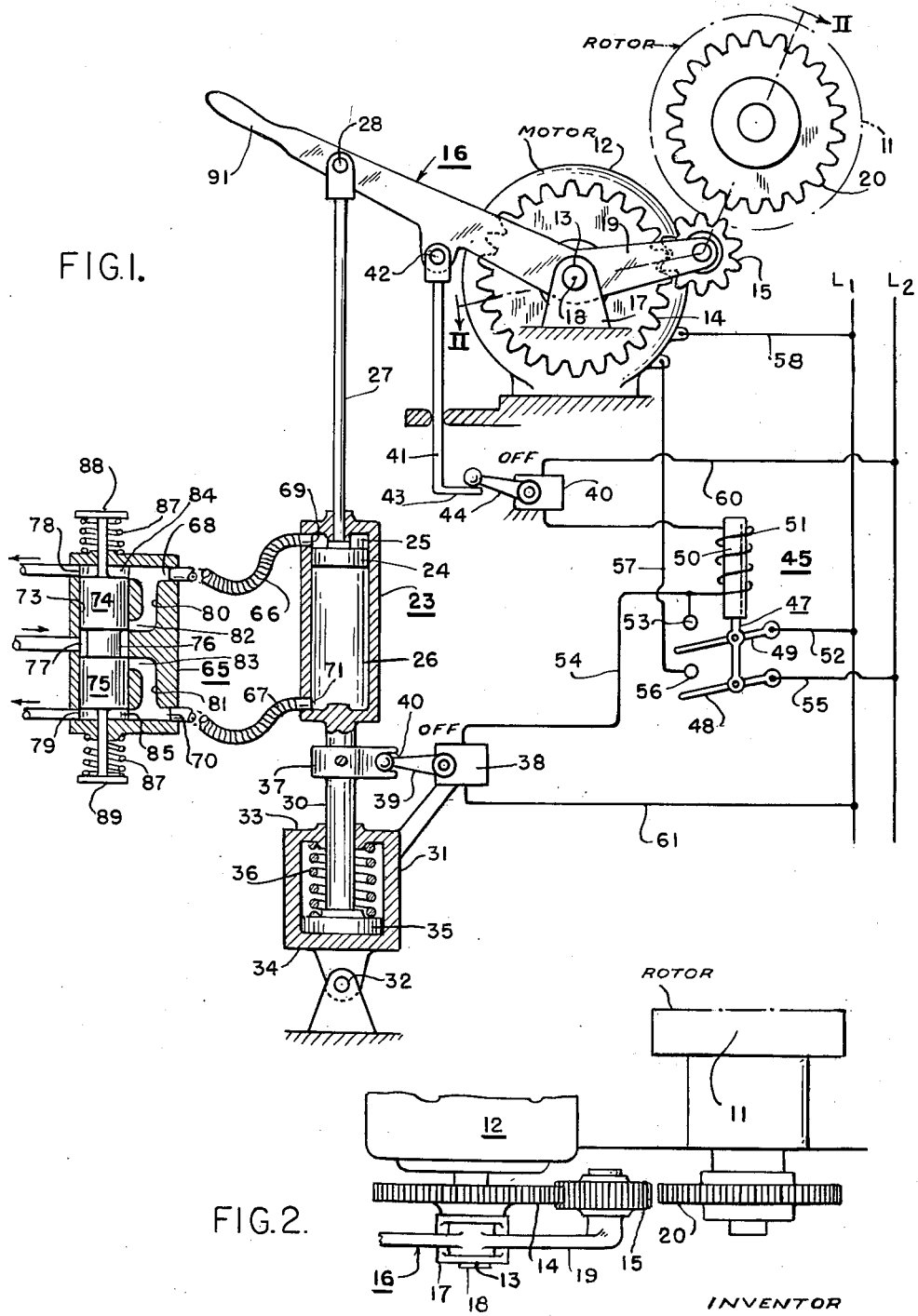
FIG. 1 is a diagrammatic view illustrating the invention in conjunction with a turbine rotor or the like, with the turning gear mechanism in the completely disengaged position.
FIG. 2 is a developed sectional view taken on line II—II of FIG. 1.

Referring to the drawings in detail, there is shown a turning gear mechanism for slowly rotating a turbine rotor 11. The turning gear mechanism comprises an electric motor 12 including an output shaft 13 having a driving gear 14 mounted thereon and driven thereby. An idling pinion 15 disposed in continuous engagement with the driving gear 14 is carried by a bell-crank or lever 16. The lever 16 is pivotally connected intermediate its ends to a suitable support 17 for angular movement about an axis 18 coincident with the axis of rotation of the motor output shaft 13, and the idling pinion 15 is carried by an arm portion 19 of the lever. Accordingly, as well known in the art, the lever 16 may be rotated about its axis 18 to any position within its limits of travel while still maintaining the idling pinion 15 in properly meshed relation with the driving gear 14.

The turbine rotor 11 is also provided with a suitable driven gear 20 disposed adjacent the idling pinion 15 and so arranged that the idling pinion 15 may be moved into and out of meshing relation with the driven gear by movement of the lever 16.

The lever 16 is actuated by a fluid actuated mechanism comprising a hollow cylinder 23 having a piston 24 slidably disposed therein and dividing the cylinder into an upper chamber 25 and a lower chamber 26. The piston 24 is provided with a rod portion 27 extending through the cylinder 23 and pivotally connected to the lever 16 at 28.

Figure 4:
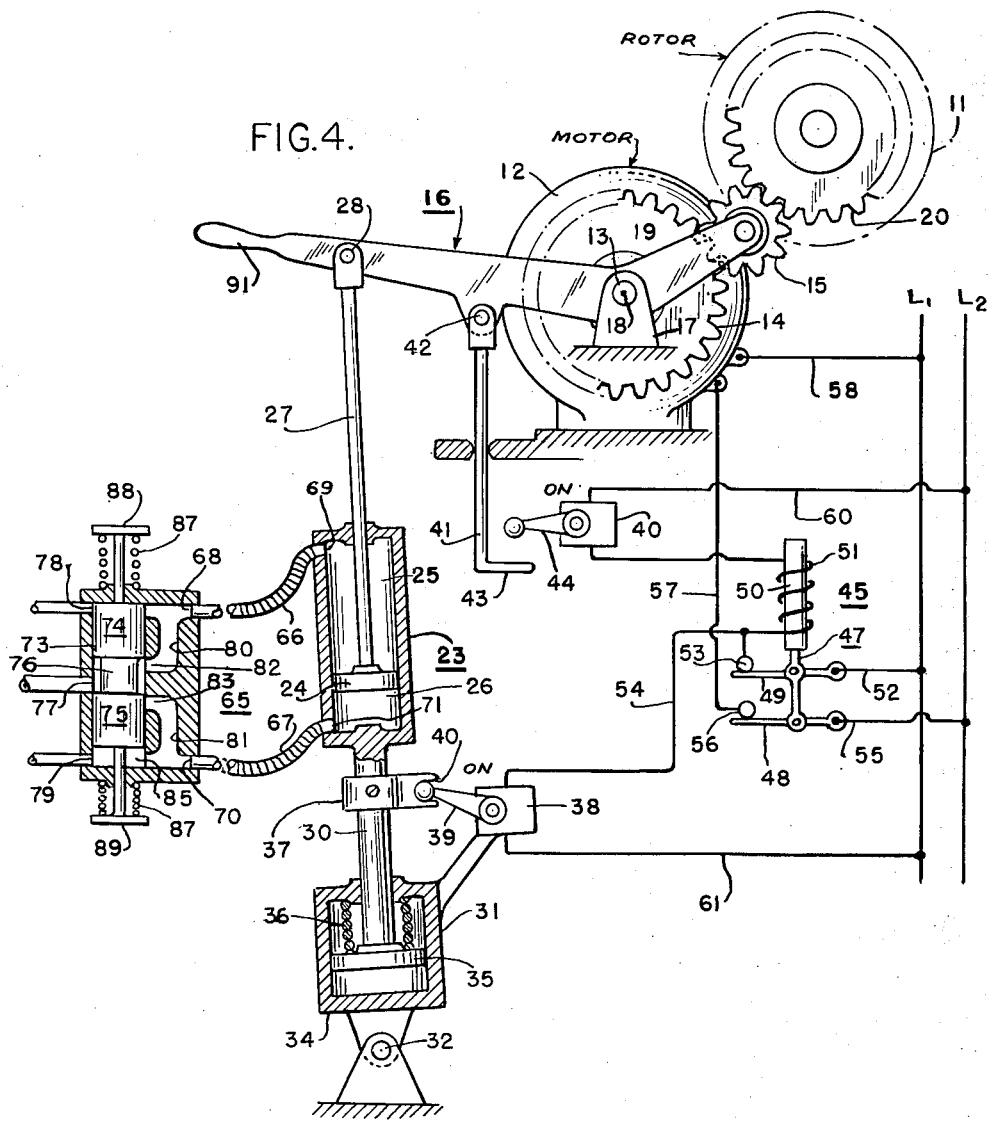
FIG. 4 is a view similar to FIG. 1 but with the turning gear mechanism in the driving position.

The cylinder 23 is of sufficient length to permit axial movement of the piston rod 27 from the position shown in FIG. 1 to the position shown in FIG. 4 and the cylinder 23 is guided for axial movement by an extension or depending portion 30 slidably received in a housing 31. The housing 31 is restrained against axial movement but is free to pivot about 32. The housing 31 is of hollow form and includes an upper wall portion 33 and a lower wall portion 34 disposed in spaced relation with each other. The cylinder extension 30 is provided with an enlarged end portion 35 which is maintained in abutment with the lower wall 34 by a suitable spring 36 compressed between the enlarged end portion 35 and the upper wall portion 33. Accordingly, the cylinder 23 is maintained in the position shown in FIG. 1 by the bias of the spring 36, but is movable in upward axial direction against the bias of the spring.

The cylinder extension 30 is further provided with a collar 37 for actuating an electric switch 38. The switch 38 is attached to the body 31 and is of any suitable on-off type provided with an actuating arm 39 received in a recess 40 formed in the collar 37. In the position shown in FIGS. 1 and 3, the switch 38 is in the off position.

A second on-off electrical switch 40 is disposed in cooperative relation with a plunger 41 pivotally connected to the lever 16 at 42 and having an abutment 43 disposed in operative engagement with the switch arm 44. In the position shown in FIG. 1, the switch 40 is held in the off position by the abutment 43.

The switches 38 and 40 are disposed in an electrical circuit generally designated 45 for selectively connecting and disconnecting the turning gear motor 12 from a pair of power supply lines L1 and L2.

The circuit 45 is termed a "holding" circuit, since the motor connection across the supply lines L1 and L2 may be maintained even after movement of switch 38 to the off position. The circuit 45 comprises an electromagnetic switch mechanism 47 having a pair of contact arms 48 and 49 carried by a solenoid 50 which is energized by a suitable coil 51. The switch arm 49 is connected to line L1 by a wire 52 and cooperates with a stationary contact 53 which is connected to the coil 51 and to one side of the switch 38 by a wire 54. The contact arm 48 is connected to L2 by a wire 55 and cooperates with a stationary contact 56 connected to one terminal of the motor by a wire 57. The other terminal of the motor is connected to line L1 by a wire 58. The other end of the coil 51 is connected to line L2 through the switch 40 by lines 59 and 60 and the other side of the switch 38 is connected to line L1 by a wire 61.

The above circuit operates in the following manner. When both switches 38 and 40 are in the on position, a circuit is completed from line L1 to line L2 through a series circuit including wire 61, switch 38, wire 54, coil 51, wire 59, switch 40, and wire 60, thereby energizing the solenoid 50 and actuating the contact arms 48 and 49 into engagement with their associated contacts 56 and 53, respectively. As the contact arms 48 and 49 are moved into engagement with their associated contacts, a circuit across lines L1, L2 is completed through the motor 12 as follows: wire 55, contact arm 48, contact 56, wire 57, the motor 12 and wire 58. The holding circuit is attained from line L1 to L2 through the coil 51 and switch 40 by the contact arm 49 and its associated contact 53 in parallel with the switch 38. Accordingly, energization of the coil 51 is maintained through wire 52 even though the circuit through switch 38 is interrupted, thereby maintaining the motor in operation until the holding circuit is interrupted by movement of the switch 40 to the off position. From the above it will now be obvious that:

(1) To connect the motor 12 across L1 and L2 both switches 38 and 40 must initially be in their on positions.

(2) Interruption of the motor circuit may be effected only by actuating both switches 38 and 40 to the off positions.

(3) After energization of the motor it will not be disconnected from L1 and L2 even though either switch 38 or switch 40 is subsequently moved to the open position.

A suitable selector valve mechanism 65 is provided for applying a pressurized fluid signal to the cylinder 23. The selector valve may be disposed a considerable distance from the cylinder and is connected thereto by a pair of conduits 66 and 67. The conduit 66 affords communication between a port 68 on the selector valve and a port 69 provided in the cylinder 23, while the conduit 67 affords communication between a port 70 in the selector valve and a port 71 in the cylinder 23. The port 69 communicates with chamber 25, while the port 71 communicates with the chamber 26 in the cylinder.

The selector valve, as illustrated, includes a body portion 72 having a piston member 73 slidably disposed therein and provided with enlarged lands 74 and 75 disposed in spaced relation with each other and connected to each other by a reduced portion 76. The body 72 is provided with an inlet port 77, connected to a suitable source of pressurized fluid such as air (not shown), and a pair of bleed ports 78 and 79. The valve body 72 is further provided with passageways 80 and 81 communicating with passageways 68 and 70, respectively, and ports 82 and 83, respectively. The bleed ports 78 and 79 communicate with upper and lower valve chambers 84 and 85, and flow circuits through the various ports described are controlled by the position of the movable valve member 73. The valve member 73 is normally retained in the null or centered position by a pair of suitable springs 87, but may be moved in downward direction by pressure exerted upon an upwardly extending rod portion 88, or in upward direction by pressure on a downwardly extending rod portion 89.

FIG. 1 shows the apparatus in standby condition with the motor deenergized, the lever 16 in the upper extreme position, the switches 38 and 40 in the off position, and the selector valve 65 in the null position.

Figure 3:
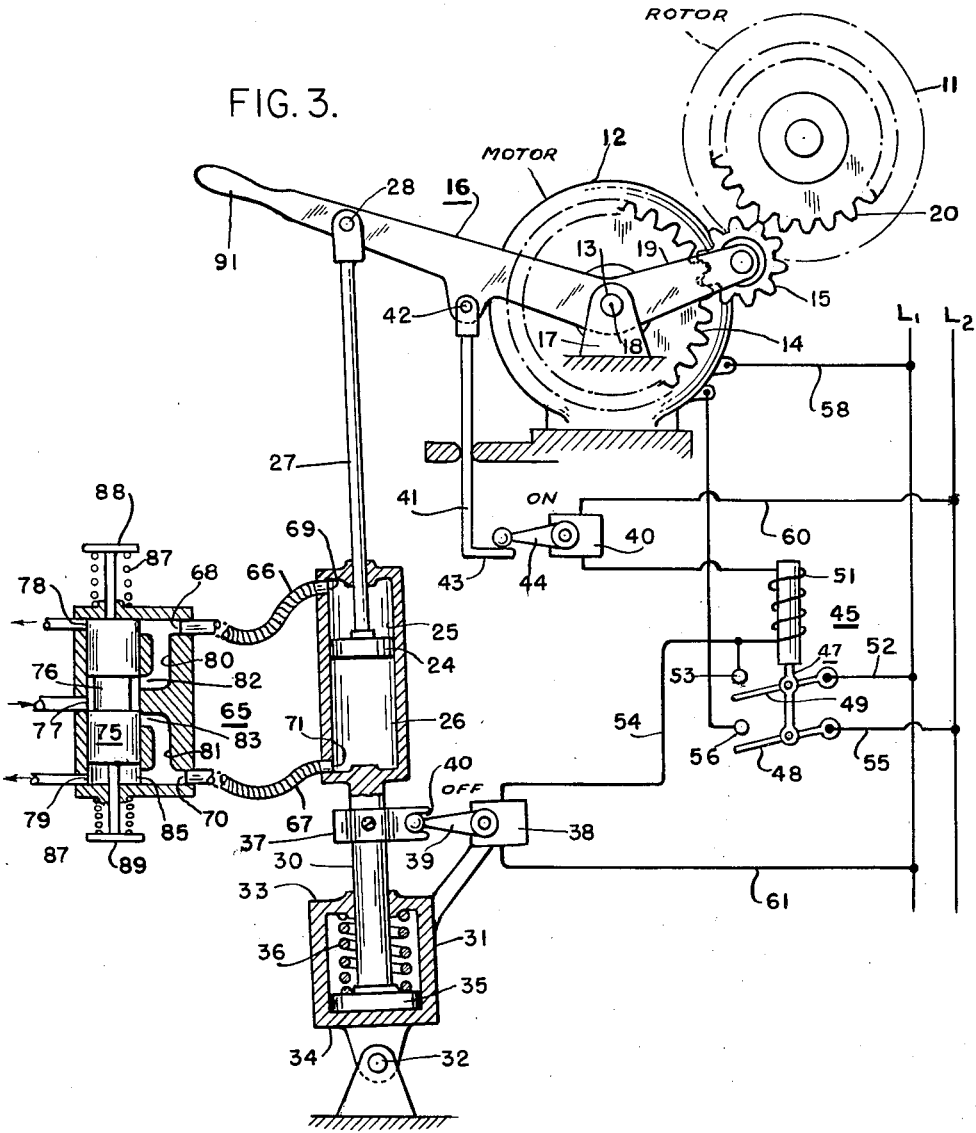
FIG. 3 is a view similar to FIG. 1 but with the turning gear mechanism in an intermediate position.

FIG. 3 shows the apparatus in an intermediate position with the selector valve 73 in the upper position, the lever 16 in an intermediate position, switch 38 in the off position and switch 40 in the on position, so that the turning gear motor 12 is deenergized.

FIG. 4 shows the position of the apparatus with the switches 38 and 40 in the on position, the motor 12 energized, the selector valve still in the upper position and the lever 16 in the lower position.

The operation of the above described apparatus is as follows: the selector valve mechanism 65 is moved from the null position shown in FIG. 1 to the position shown in FIG. 3 by urging the piston member 73 upwardly. This movement may be obtained in many different ways, for example, by manual effort. With the piston member 73 in the upper position, the valve port 82 is disposed in communication with the fluid pressure inlet port 77, and pressurized fluid flows through the passageway 80 and port 68, through conduit 66 and cylinder port 69 to the upper chamber 25 of the cylinder, thereby forcing the piston 24 downwardly to the position shown in FIG. 3 and moving the lever 16, from the position shown in FIG. 1 to the position shown in FIG. 3, until further motion of the lever is arrested by contact of the idling pinion 15 with the driven gear 20 on the rotor. During such downward movement of the lever 16, the plunger 41 is also moved downwardly thereby permitting the arm 44 of the switch 40 to move downwardly to the on position of the switch.

As further motion of the piston 24 is arrested, the pressure in the cylinder chamber 25 is effective to urge the cylinder upwardly against the bias of its spring 36 to the position shown in FIG. 4, thereby actuating the switch arm 39 of the switch 38 upwardly to the on position.

Since both switches 40 and 38 are now in the on position, the motor circuit 45 is completed, thereby energizing the electromagnetic switch 47 and connecting the motor to the power supply lines L1, L2. As the motor driving gear 14 initiates rotation of the idling pinion 15 in the direction indicated by the arrow, the idling pinion will slip a tooth and, immediately thereupon, the fluid pressure in the cylinder chamber 25 is effective to move the lever 16 further downwardly to its extreme lower position as shown in FIG. 4, thereby fully meshing the idling pinion and initiating rotation of the rotor 11 at a steady slow speed.

As soon as driving engagement is obtained, the upward force on the selector valve member 73 may be released, thereby permitting the valve member 73 to return to its null position in which the ports 82 and 83 are blocked and the bleed ports 78 and 79 are placed in communication with the upper and lower cylinder ports 68 and 70, respectively. Accordingly, the downward force on the piston 24 is dissipated and the upward force on the cylinder 23 is dissipated. The lever 16, however, is maintained in the lower position by the driving effect of the idling pinion 15 on the driven gear tending to maintain the two in driving engagement, as long as power is being transmitted by the idling pinion 15 to the driven gear 20.

Upon dissipation of the upward fluid pressure on the cylinder 23, the cylinder 23 will return to its original position (shown in FIG. 1), thereby actuating switch 38 to the off position. However, as described previously, the switch 40 is effective to maintain the holding circuit connecting the turning gear motor 12 across lines L1, L2.

When it is desired to terminate the slow speed rotation of the turbine rotor 11, the selector valve piston is urged downwardly against its bias to the lower position. In this position, the ports 83 and 78 are unblocked, port 82 remains blocked and 79 is blocked, so that flow of pressurized fluid is directed through the inlet port 77 and port 83, through passageway 81 and conduit 67 to the lower chamber 26 of the cylinder 23, thereby urging the piston 24 upwardly and causing the lever 16 to move to its uppermost position, shown in FIG. 1. During such upward movement of the lever 16, the plunger 41 is also moved upwardly thereby actuating the switch 40 to its off position. Accordingly, the idling pinion 15 is automatically disengaged from the driven gear 20 and the holding circuit 45 is interrupted, thereby disconnecting the motor 12 from lines L1, L2 and placing the apparatus in condition for subsequent use.

It will now be seen that the invention provides a highly effective mechanism for smoothly engaging and disengaging the turning gear from a rotor which is to be driven thereby at slow speeds of rotation either before motivating the turbine with steam or after a running period. It will further be seen that, with this arrangement, the turning gear may be actuated by a simple depressing operation remotely from the turning gear and that the system moves in an established sequence to engage or cause the idling pinion 15 to contact the teeth of the driven gear 20 before the turning gear motor 12 is energized. With this arrangement, damage to the turning gear motor and its associated gearing is obviated.

Since after the turning gear is disposed in driving relation with the driven gear 20, the fluid pressure signal to the cylinder 23 is interrupted and the excess pressure is scavenged therefrom, the lever 16 is provided with a hand grip portion 91, so that it may be manually moved, if desired, from the position shown in FIG. 4 to the position shown in FIG. 1 to terminate rotation of the driven gear 20 and disconnect the turning gear motor 12 from the power supply line. This method of terminating the driving of the rotor 11 need not ordinarily be employed. However, if for any reason, the fluid actuated components fail to operate for any reason, this method may be employed with safety.

While the invention has been shown in but one form, it will be obvious to those skilled in the art that it is not so limited, but is susceptible of various changes and modifications without departing from the spirit thereof.

What is claimed is:

1. In combination, a rotor having a gear connected thereto, an electric motor, means including a pinion driven by said motor for selectively engaging and disengaging said gear, means including a switch movable to an "on" position for energizing and to an "off" position for deenergizing said motor, means for providing a fluid pressure signal, and a mechanism responsive to said signal, said mechanism including means for initially moving said pinion into contact with said gear and means for subsequently actuating said switch to said "on" position said two last mentioned means being operable in a sequential manner.

2. In combination, a rotor having a gear connected thereto, an electric motor having an output shaft, a pinion driven by said output shaft, a lever, said pinion being rotatably carried by said lever and movable into and out of engagement with said gear, means including a switch movable to an "on" position to energize said motor, means for providing a pressurized fluid signal, and a mechanism actuated by said fluid signal for controlling the position of said lever and said switch, said mechanism comprising a cylinder, a piston slidably disposed in said cylinder and dividing the latter into a first and a second chamber, conduit means for admitting said pressurized fluid signal to said first chamber, a rod connecting said piston to said lever, means carried by said cylinder for actuating said switch, and means biasing said cylinder to a position maintaining said switch in the "off" position, said cylinder being movable against said bias by said pressurized fluid signal and actuating said switch to the "on" position.

3. In combination, a rotor having a gear connected thereto, an electric motor, a pinion driven by said motor for driving said gear, means including a lever carrying said pinion and selectively engaging and disengaging said pinion and gear, means including a switch movable to an "on" position for energizing and to an "off" position for deenergizing said motor, means for providing a fluid pressure signal, and a mechanism comprising a cylinder, a piston slidably received in said cylinder and connected to said lever, said piston being movable in one direction in response to said signal and initially moving said pinion into contact with said gear, and said cylinder being movable in the opposite direction in response to said signal subsequent to movement of said piston and actuating said switch to said "on" position.

4. In combination, a rotor having a gear connected thereto, an electric motor having an output shaft, a pinion driven by said output shaft, a lever, said pinion being rotatably carried by said lever and movable into and out of engagement with said gear, means including a switch movable to an "on" position to energize said motor, means for providing a pressurized fluid signal, and a mechanism actuated by said fluid signal for controlling the position of said lever and said switch, said mechanism comprising a cylinder, means pivotally supporting said cylinder, a piston slidably disposed in said cylinder and dividing the latter into a first and a second chamber, conduit means for admitting said pressurized fluid signal to said first chamber, a rod connecting said piston to said lever, means carried by said cylinder for actuating said switch, and means biasing said cylinder to a position maintaining said switch in the "off" position, said piston being movable in one direction in response to said signal and initially moving said lever in a direction to effect engagement of said pinion with said gear, and said cylinder being subsequently movable in the opposite direction against said bias by said fluid signal and actuating said switch to the "on" position.

5. In combination, a rotor and turning gear mechanism for driving said rotor at slow speed comprising a gear connected to said rotor, an electric motor having an output shaft, a pinion driven by said output shaft, a lever, said pinion being rotatably carried by said lever and movable into and out of engagement with said gear, an electrical power supply, an electrical holding circuit for connecting said motor to said power supply including a first switch actuated by said lever, a second switch movable to an "on" position to energize said motor when said first switch is in the "on" position, means for providing a pressurized fluid signal, and a mechanism actuated by said fluid signal for controlling the position of said lever and said second switch, said mechanism comprising a cylinder, means pivotally supporting said cylinder, a piston slidably disposed in said cylinder and dividing the latter into a first and a second chamber, a source of pressurized fluid, a selector valve connected to said source of pressurized fluid, conduit means for admitting said pressurized fluid to said first and said second chamber in accordance with the position of said valve, a rod connecting said piston to said lever, means carried by said cylinder for actuating said second switch, and means biasing said cylinder to a position maintaining said second switch in the "off" position, said selector valve being movable to a first position directing pressurized fluid to said first chamber, said piston being movable in one direction in response to pressure of said fluid in said first chamber and moving said lever in a direction to effect engagement of said pinion with said gear, and said cylinder being subsequently movable in the opposite direction against said bias by the pressure of said fluid and actuating said second switch to the "on" position.

References Cited in the file of this patent
UNITED STATES PATENTS
2,200,781    Smith _____ May 14, 1940